Sept. 19, 1967  E. LASITER  3,342,355
VEHICLE UNLOADER

Filed March 15, 1965  2 Sheets-Sheet 1

INVENTOR.
ELVIE LASITER
BY
John H. Widdowson
ATTORNEY

Sept. 19, 1967   E. LASITER   3,342,355
VEHICLE UNLOADER
Filed March 15, 1965   2 Sheets-Sheet 2
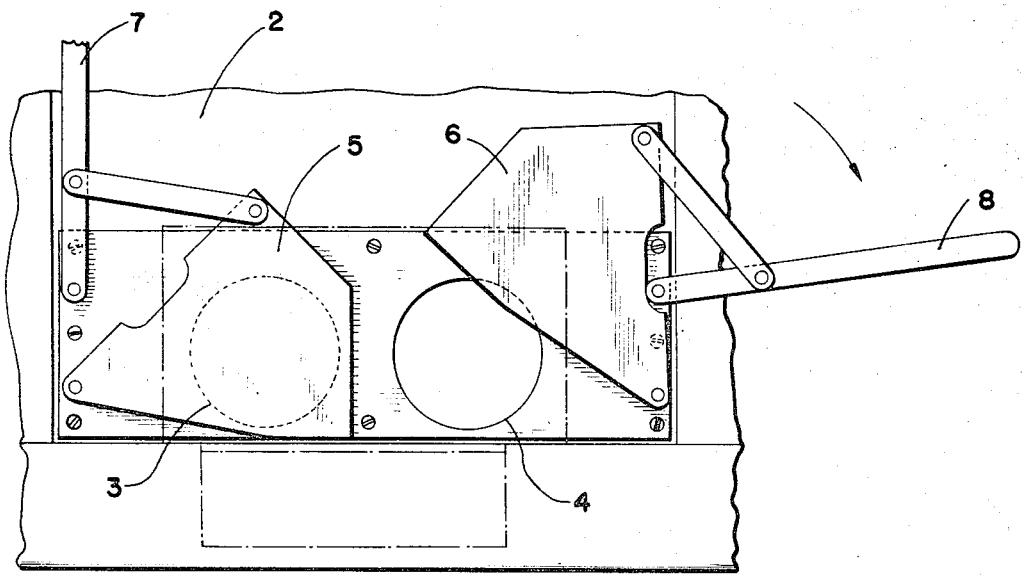
FIG. 3
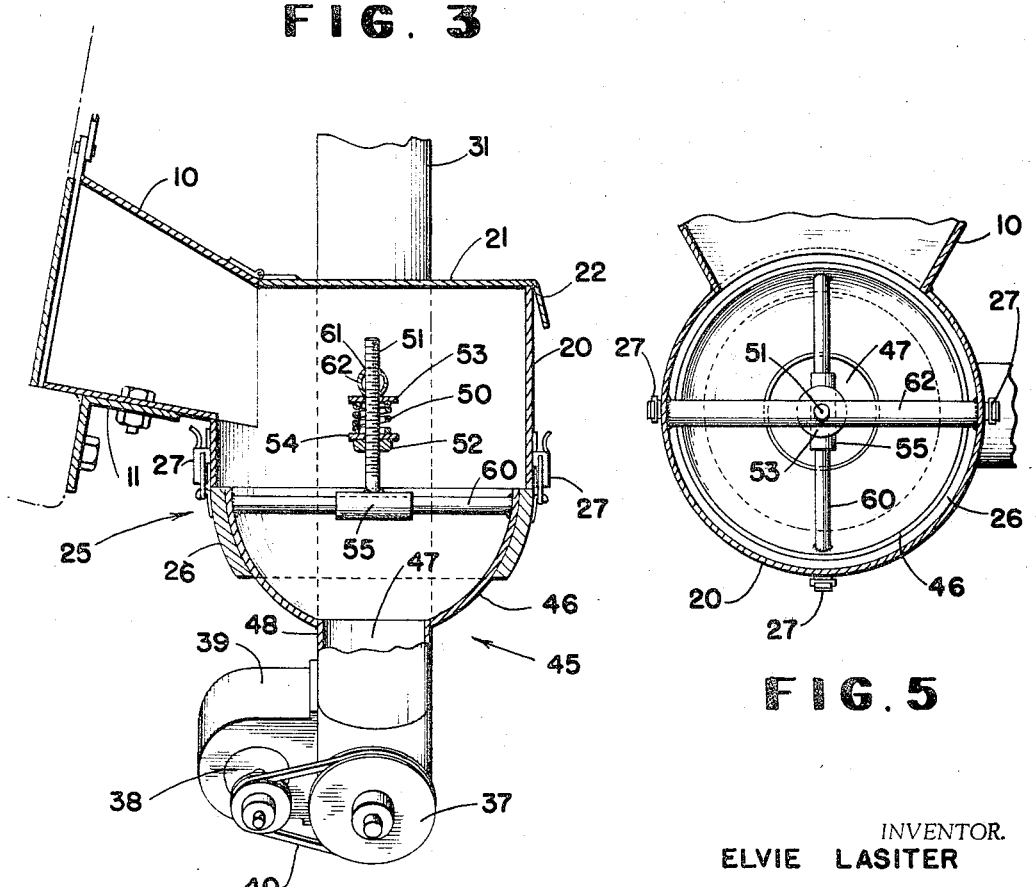
FIG. 4
FIG. 5
INVENTOR.
ELVIE LASITER
BY John H. Widdowson
ATTORNEY

United States Patent Office 3,342,355
Patented Sept. 19, 1967

3,342,355
VEHICLE UNLOADER
Elvie Lasiter, Grant County, Okla.
(Box 9, Rte. 2, Caldwell, Kans. 67022)
Filed Mar. 15, 1965, Ser. No. 439,789
2 Claims. (Cl. 214—83.26)

This invention relates to an unloading conveyor for conveying materials such as grain, fertilizer, and the like. More particularly, this invention relates to an unloading conveyor which is adjustable so that material stored in reservoirs such as wagon and truck bodies, bins and the like may be readily discharged from the storage reservoir to the desired location.

There has long been a need, particularly in the agricultural industry, for an unloading conveyor adaptable for various materials which allows the material to be discharged at a variety of locations adjacent to the storage reservoir. For example, such a conveyor may be used to fill grain drill boxes in the field, or to spread materials such as fertilizer uniformly. To accomplish this, the conveyor must be adjustable so that its discharge end can be easily moved to the desired location where the material is to be conveyed. Also, the unloading conveyor must be readily adaptable for use with a variety of storage reservoirs, such as truck and wagon bodies, grain bins and the like.

Heretofore known unloading conveyors, which generally include a screw auger assembly to convey the material, have been unsatisfactory because the discharge end of the screw auger could not be adjusted with adequate facility to convey the material to the desired location.

It, is, therefore, a primary object of this invention to provide an unloading conveyor which is easily adjusted to discharge the material being conveyed to various desired locations.

It is a further object of this invention to provide an unloading conveyor for use with a variety of materials which is adjustable to allow material to be discharged from storage reservoirs, such as trucks, wagons, bins and the like, to various desired locations.

It is a still further object of this invention to provide an unloading conveyor in which the screw auger section is rotatably mounted to permit the discharge end thereof to be adjusted to a variety of desired locations.

It is an additional object of this invention to provide an unloading conveyor in which the screw auger section is mounted by ball and socket means to permit the discharge end thereof to be movable in any desired direction.

Generally described, this invention relates to an unloading conveyor comprising a gathering box adapted to receive the material to be conveyed, one end of said box including socket means, an elongated conduit including an inlet opening and an outlet opening, a screw auger rotatably mounted within said conduit, means to rotate said auger to convey said material from said inlet opening to said outlet opening, ball means connected to said conduit about said inlet opening and slidably engaged with said socket means, said ball means including a passage extending therethrough so that said gathering box is in sealed communication with said conduit, whereby said conduit is pivotally connected to said gathering box to permit said unloading conveyor to discharge said material to a variety of locations.

This invention can be described more specifically by reference to the accompanying drawings, which illustrate one embodiment of the unloading conveyor of this invention used in conjunction with a grain truck.

In the drawings:

FIGURE 3 is a removed view showing the closable ports connecting the interior of the truck bed with the unloading conveyor;

FIGURE 4 is a partial sectional view taken along the line 4—4 of FIGURE 2; and

FIGURE 5 is a sectional view taken along the line 5—5 of FIGURE 2.

Figure 1:
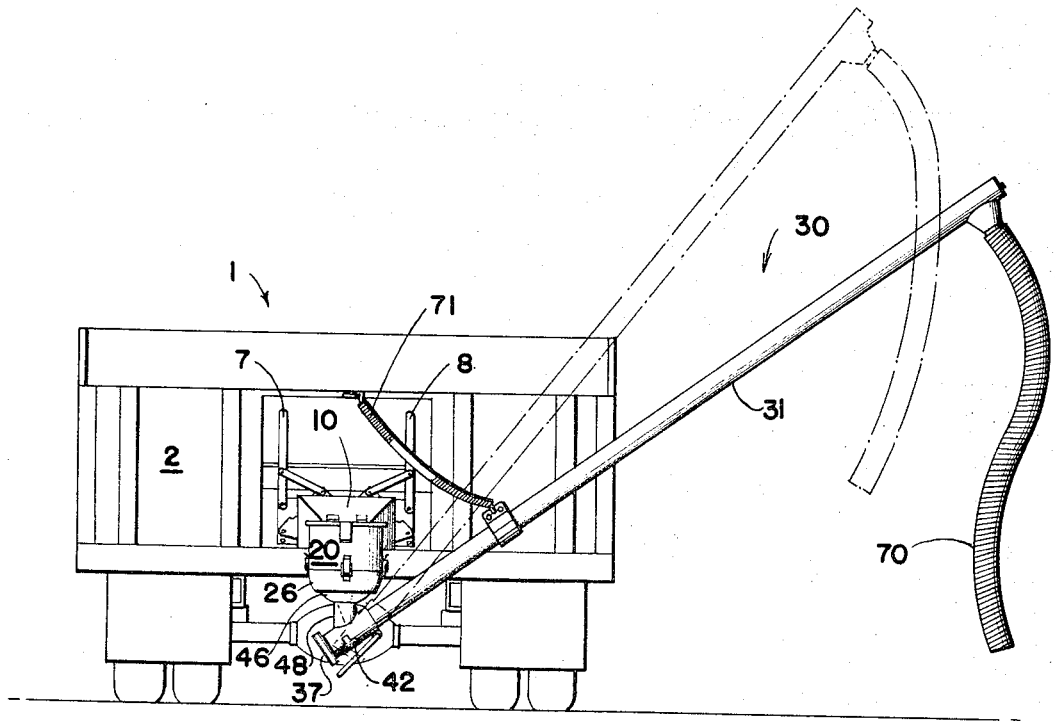
FIGURE 1 illustrates the unloading conveyor of this invention mounted on the tailgate of a grain truck.

Referring initially to FIGURE 1, a grain truck of the conventional type is generally indicated by the numeral 1. Tailgate section 2 of the truck body 1 includes ports 3 and 4 in its center portion, as best seen in FIGURE 3. Gates 5 and 6 are pivotally mounted on the tailgate section 2 and include hand levers 7 and 8 which can be operated to open or close the ports 3 and 4. A discharge chute 10 (FIGURE 4) is also mounted on the tailgate section 2, such as by bracket 11, and surrounds the ports 3 and 4, to form a substantially tight connection between the tailgate section 2 and the chute 10. Thus, the material contained in truck 1 discharges directly into chute 10 when the ports 3 and 4 are opened by operating levers 7 and 8.

A hopper or gathering box 20, preferably cylindrical, is connected to the outer end of the discharge chute 10 in line to receive the material being conveyed through the discharge chute. Gathering box 20 includes a pivoted cover plate 21 having a handle 22, which prevents the loss of material from the gathering box during the operation of the conveyor. Cover plate 21 also allows inspection and servicing of the gathering box 20 if such becomes necessary.

Figure 2:
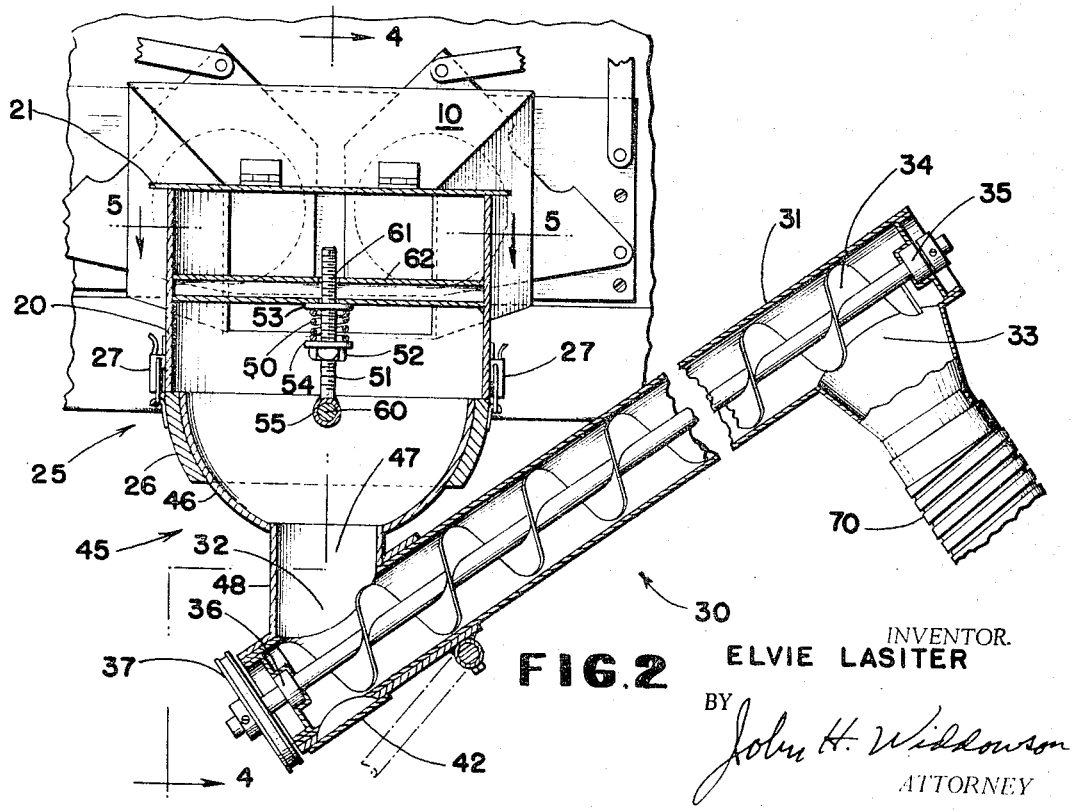
FIGURE 2 is a sectional view of the unloading conveyor shown in FIGURE 1.

One end of gathering box 20, preferably the lower end as shown in FIGURES 2 and 4, includes socket means to form a part of a ball and socket connection between the gathering box and the screw auger section, as will be further described hereinafter. This socket means, generally indicated by the numeral 25, is preferably spherical, and in this embodiment comprises the spherical segment 26 positioned on the lower end of the gathering box 20. As best illustrated in FIGURES 2 and 4, segment 26 is removably connected to the gathering box 20 by clamping means 27.

The screw auger section of the unloading conveyor, generally indicated by the numeral 30, is best seen in FIGURE 1. This section 30 comprises an elongated conduit 31 which is sealed at its ends and which includes inlet opening 32 adjacent the lower end and outlet opening 33 adjacent the upper end, as seen in FIGURE 2. A screw auger 34 is rotatably mounted within conduit 31 by bearings 35 and 36 positioned in the ends of the conduit, and a pulley 37 is fixed to the screw auger 34, preferably at the lower end of the conduit. Suitable motor means 38, such as an internal combustion engine or electric motor, is supported by a casing 39 adjacent to the pulley 37, and a belt 40 connects the motor 38 to the pulley. Hence, when the motor 38 is switched on by any suitable means, not shown, the screw auger 34 is rotated within conduit 31 to carry the material from the inlet opening 32 through the conduit to the outlet opening 33.

A removable cleaning plate 42 can be attached over an opening in the lower end of conduit 31, as seen in FIGURES 1 and 2, to allow inspection and cleaning of the conduit, as may be needed to insure efficient operation of the unloading conveyor.

The screw auger section 30 also includes ball means, generally denoted by the numeral 45, engageable with the socket means 25 of gathering box 20, to pivotally connect the auger section to the gathering box. The ball means 45 also includes a passage which brings the conduit 31 into communication with the inside of the gathering box 20, so that the material being conveyed will flow from the gathering box into the conduit.

In this embodiment, ball means 45 comprises a spherical cup 46 which is engageable with the spherical segment 26 to form a ball and socket connection between the elongated conduit 31 and the gathering box 20. The cup 46 is in sealed communication with conduit 31 through the passage 47 formed by the hollow member 48 extending from the lower portion of cup 46 to the conduit 31 around the inlet opening 32.

The weight of the auger section 30 will tend to maintain cup 46 in sealed engagement with the spherical segment 26 in this embodiment. However, it is preferred to include biasing means to urge the ball means 45 toward the socket means 25 to insure a sealed ball and socket connection, so that the material being conveyed will not be lost as it flows from the gathering box 20 into the screw auger section 30.

The biasing force can be provided by a coil spring 50. To connect spring 50 between the ball means 45 and the socket means 25, without interfering with the operation of the ball and socket connection, spring 50 can be mounted on a threaded spindle 51, and held in position thereon by nut 52. Washers 53 and 54 can be placed on the ends of the spring 50, as seen in FIGURES 2 and 4, to provide bearing surfaces for the spring. The lower end of spindle 51 is attached to a sleeve 55 which pivotally connects with a rod 60 extending across the inside of cup 46. The upper end of spindle 51 projects through an aperture 61 in a rod 62 extending across the inside of the gathering box 20. The aperture 61 is slightly larger than the diameter of the spindle 51 to allow the spindle to rotate or move axially within the aperture. If desired, the threads on the upper portion of spindle 51 can be eliminated to allow the spindle to slide freely within the aperture 61.

When the screw auger section 30 is connected to the gathering box 20 the spindle 51 extends through the aperture 61 so that the rod 62 bears against the washer 53 to compress the spring 50. The spring 50 thus urges the cup 46 toward the spherical segment 26 to insure a sealed ball and socket connection between the gathering box 20 and the screw auger section 30. Moreover, since the sleeve 55 is free to pivot about the rod 60, and the spindle 51 can rotate or slide axially within the aperture 61 in rod 62, this arrangement does not interfere with the operation of the ball and socket connection formed by socket means 25 and ball means 45.

A discharge tube 70, preferably of the flexible tube type, is connected to conduit 31 about the outlet opening 33 so that the material can be readily conveyed through tube 70 to the desired location. In addition, support means, such as spring 71 connected between conduit 31 and the tailgate section 2 of the truck, can be employed to support the outer end of conduit 31 during the conveying operation.

When using the invention to convey materials such as grain, fertilizers and the like, the motor 38 is engaged to begin the rotation of screw auger 34, and handles 7 and 8 are pivoted to open ports 3 and 4 in the tailgate section 2 of the truck 1. The material will thus discharge from truck 1 into the gathering box 20 through the discharge chute 10. From gathering box 20 the material will flow through passage 47 in the ball means 45, and through inlet opening 32, into conduit 31. The rotation of screw auger 34 will then convey the material to the outlet opening 33, from where it will flow through the discharge tube 70.

To discharge the material being conveyed to any desired location in accordance with this invention, the operator can direct material to the discharge point by merely pulling on the lower end of the tube 70. Because of the ball and socket connection to the gathering box 20, the screw auger section 30 can be pivoted in any direction to bring the end of tube 70 to the desired location. The unloading conveyor can thus be easily adjusted to discharge the material to a variety of locations.

Although only one embodiment of this invention has been described above, many modifications can be devised by those skilled in the art without departing from the spirit of the invention, which is limited solely by the appended claims.

What I claim is:
1. An unloading conveyor comprising:
   a gathering box adapted to receive the material to be conveyed, one end of said box including socket means,
   an elongated conduit including an inlet opening and an outlet opening,
   a screw auger rotatably mounted within said conduit,
   means to rotate said auger to convey said material from said inlet opening to said outlet opening,
   ball means connected to said conduit about said inlet opening and slidably engaged with said socket means, said ball means including a passage extending therethrough so that said gathering box is in sealed communication with said conduit,
   biasing means connected to said ball means to urge said ball means toward said socket means to retain said ball means in sealed engagement with said socket means,
   whereby said conduit is pivotally connected to said gathering box to permit said unloading conveyor to discharge said material to a variety of locations,
   said gathering box extended upright and said socket means mounted on the lower end of said gathering box, and
   said socket means being the lower end of said gathering box operable to convey material downwardly into said ball means.
2. An unloading conveyor comprising:
   a gathering box adapted to receive the material to be conveyed, the material entering said box through a truck body having a tailgate to which said gathering box is attached in communication,
   an elongated conduit including an inlet opening and an outlet opening,
   a screw auger rotatably mounted within said conduit,
   means to rotate said auger to convey said material to said outlet opening from said inlet opening,
   spherical ball means, said ball means connected to said conduit about said inlet opening and slidably engaged with said socket means, said ball means including a passage extending therethrough so that said gathering box is in sealed communication with said conduit, whereby said conduit is pivotally connected to said gathering box to permit said unloading conveyor to discharge said material to a variety of locations, and
   biasing means having a helical spring mounted upon a spindle, the lower end of said spindle being pivotally connected to said cup and the upper end of said spindle extending through a bar included in said gathering box, whereby said bar can compress said spring to urge said cup towards said spherical segment.

References Cited

UNITED STATES PATENTS

| 2,103,212 | 12/1937 | Turner et al. | 198—118 X |
| 2,107,682 | 7/1937 | Wall | 214—83.26 X |
| 2,401,465 | 6/1946 | Cwicig | 214—83.26 |
| 2,438,301 | 3/1948 | Schulte | 214—522 |
| 2,675,932 | 4/1954 | Potter | 214—83.26 |
| 2,751,097 | 6/1956 | Miller | 214—83.32 |

FOREIGN PATENTS

| 929,951 | 6/1963 | Great Britain. |

EVON C. BLUNK, *Primary Examiner.*

M. L. AJEMAN, *Assistant Examiner.*